United States Patent [19]

Ruehle

[11] Patent Number: 4,511,112
[45] Date of Patent: Apr. 16, 1985

[54] ENGINE TEST STAND

[75] Inventor: Edward A. Ruehle, Redford Township, Wayne County, Mich.

[73] Assignee: Chrysler Corporation, Highland Park, Mich.

[21] Appl. No.: 360,279

[22] Filed: Mar. 22, 1982

[51] Int. Cl.³ .............................................. F16M 13/00
[52] U.S. Cl. ..................... 248/544; 248/676; 248/678
[58] Field of Search ............. 248/544, 676, 678, 646

[56] References Cited

U.S. PATENT DOCUMENTS

| | | | |
|---|---|---|---|
| 1,424,190 | 8/1922 | Cole et al. | 248/676 |
| 1,707,203 | 3/1929 | Thornley | 248/676 |
| 2,722,392 | 11/1955 | Talbot | 248/678 |
| 3,866,867 | 2/1975 | La Rocca | 248/646 |
| 4,117,997 | 10/1978 | Gitzendanner | 248/678 |
| 4,226,400 | 10/1980 | Vanderwal | 248/646 |
| 4,354,655 | 10/1982 | Hengst | 248/676 |
| 4,364,695 | 12/1982 | Lenz | 248/676 |

Primary Examiner—Ramon S. Britts
Assistant Examiner—Ramon O. Ramirez
Attorney, Agent, or Firm—Kenneth H. MacLean, Jr.

[57] ABSTRACT

This application relates to an engine test stand and mounting system for vehicle engines during testing by a dynamometer or other testing device requiring engine operation. Previous engine test stands utilized rigid metal bed plates which were permanently secured to the floor or ground structure. Thus an engine had to be mounted thereto while the dynamometer went unused. The present invention provides a movable frame on which an engine is mounted at a location remote from the dynamometer. The frame may then be moved into operative relationship to the dynamometer and supported by a plurality of post supports which secure the frame to the ground and accurately position the frame and engine with respect to the dynamometer.

8 Claims, 6 Drawing Figures

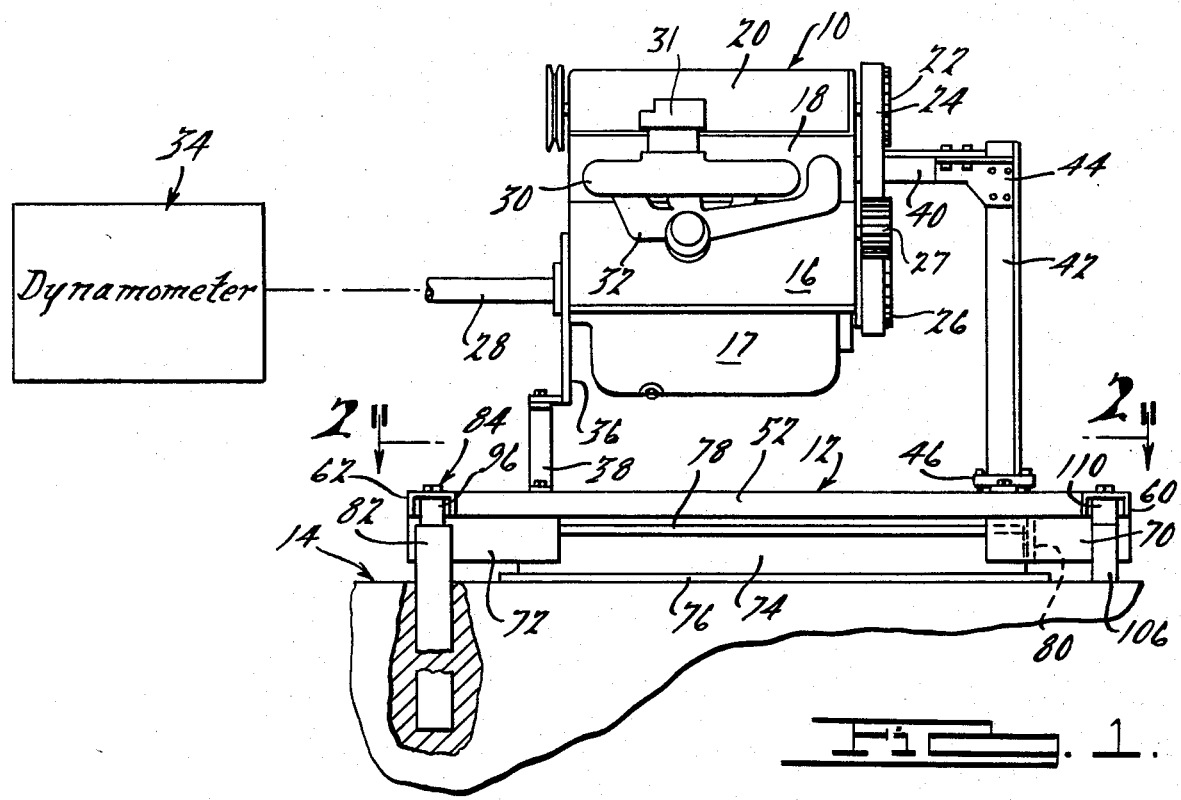
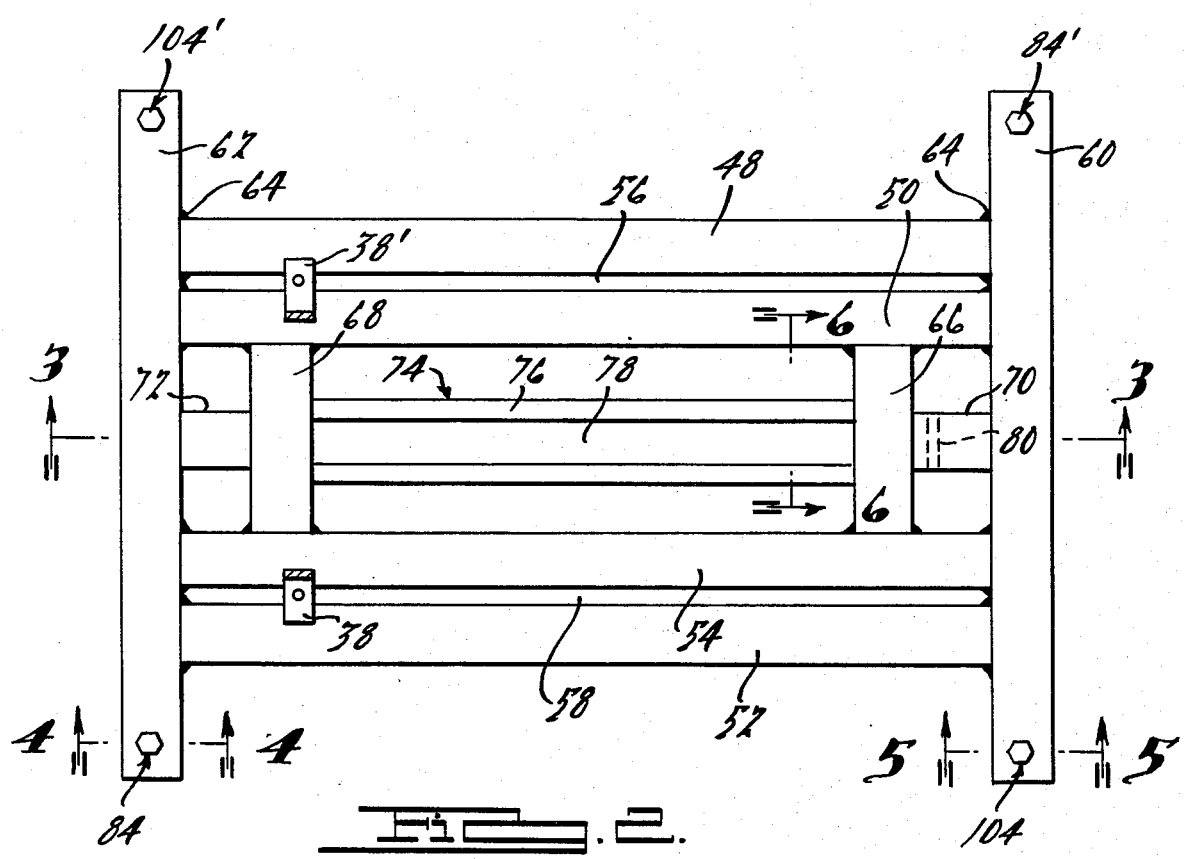

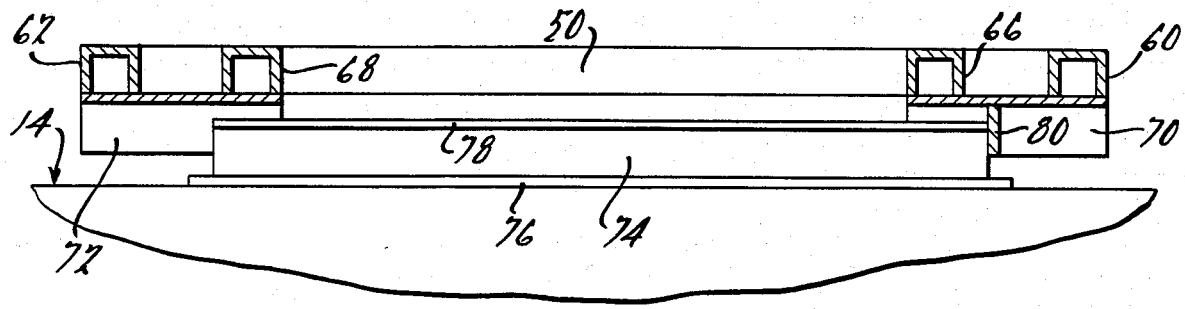
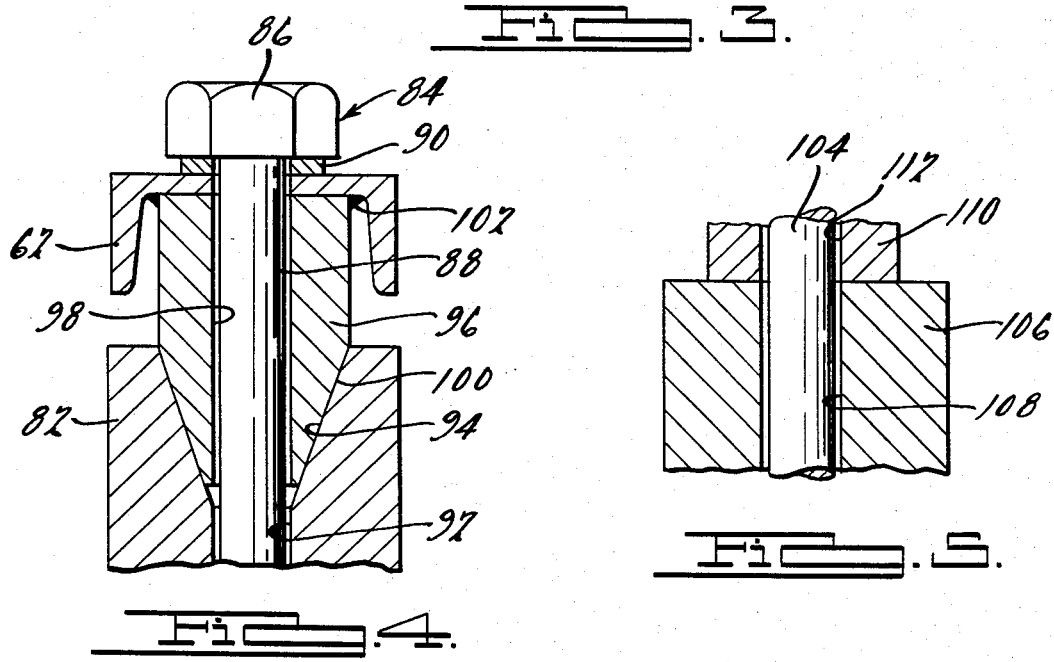
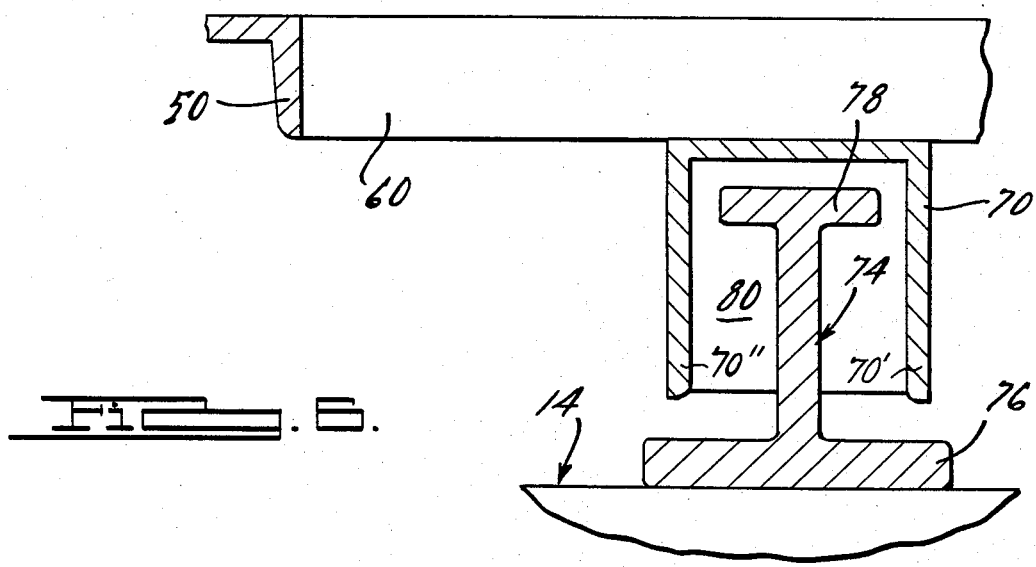

ENGINE TEST STAND

BACKGROUND OF THE INVENTION

This invention relates to engine support apparatus for test mounting an automobile engine with respect to test instruments such as a dynamometer and so configured to permit rapid change-overs from one test engine to another test engine.

Presently, engines are mounted and located with respect to a dynamometer or other test instrument in a manner which does not permit one engine to be quickly substituted for another. These prior engine support systems for tests utilize heavy metal bed plates which are permanently attached to the ground. The test engines must be individually mounted to the bed plate and aligned with the dynamometer. This will normally require several hours to mount one test engine. Present engine mount systems and related apparatus include the aforementioned metal bed plate which is of tool quality steel. The bed plate is very accurately made and will normally cost many thousands of dollars. The bed plate includes ground recess means so that various universal engine mounting brackets can be fastened to the bed plate.

When it is desired to mount an engine on the bed plate in accurate relationship to a dynamometer, brackets must first be attached to the bed plate and engine. Then various adjustments, shims or other means must be employed to align the center line of the dynamometer with the center line of the engine crankshaft. When it is desired to remove the engine from the bed plate, the previously recited steps for mounting the engine must be carried out in reverse order. The aforedescribed mounting arrangement is particularly undesirable when multiple tests must be run on a particular engine but spaced out in time, due for instance to engine modification. With each test, the mount and demount procedure must be followed. With each change, small but important variations in alignment and mounting occur.

SUMMARY OF THE INVENTION

The subject engine mount and system apparatus overcomes the aforementioned undesirable features inherent in the previously described bed plate type of engine mount. Instead, a moveable frame is used to mount and support the engine preferably at a location remote from the dynamometer so as not to interfere with other engine tests. The moveable frame with the engine mounted thereon may then be moved by a simple forklift type vehicle to the testing location adjacent the dynamometer. The frame is then located upon a plurality of mounting posts which are securely planted into the ground structure. The connections between the mounting posts and the frame are configured and designed so that the frame is automatically positioned in a predetermined relationship to the dynamometer without additional efforts. Accordingly, a frame and an engine mounted thereon may be successively mounted or demounted with respect to the posts so as to readily facilitate successive testing of an engine or many engines without the mounting burden which was previously discussed.

The aforedescribed engine test and mounting means eliminates the necessity for the very expensive machined metal bed plate which forms the basic support for prior engine test stands. In addition, the use of a plurality of posts in place of a bed plate also greatly simplifies the securing of the whole apparatus to the ground. Thus, the posts are sunk into the ground to any predetermined depth such as 10 feet or as necessary and desired. This provides a stable platform for the test engine.

Although some advantages and desirable features of the subject engine mounting apparatus have been discussed, a fuller understanding of the invention may be better gained by a reading of the following detailed description of one particular but representative embodiment of the invention which is illustrated in the accompanying drawings.

DESCRIPTION OF THE DRAWINGS

FIG. 1 is a partially sectioned elevational view of an engine upon the subject test mount and support apparatus;

FIG. 2 is a planar view of the support frame generally taken along section line 2—2 in FIG. 1 and looking in the direction of the arrows;

FIG. 3 is a sectional view of the apparatus taken along section line 3—3 in FIG. 2 and looking in the direction of the arrows;

FIG. 4 is an enlarged sectional view of the mounting hardware taken along section line 4—4 in FIG. 2 and looking in the direction of the arrows;

FIG. 5 is an enlarged sectional view of mounting hardware taken along section line 5—5 in FIG. 2 and looking in the direction of the arrows;

FIG. 6 is an enlarged sectional view of alignment means for the test frame with respect to the support structure and taken along section line 6—6 in FIG. 2 and looking in the direction of the arrows.

DESCRIPTION OF THE PREFERRED REPRESENTATIVE EMBODIMENT

In FIG. 1 of the drawings, an automobile engine 10 is illustrated and mounted above a test frame member 12. The test frame member 12 is supported with respect to the ground 14 in a manner to be described hereinafter. The particular engine 10 is disclosed as a four cylinder in-line type engine with an overhead cam type configuration. More specifically, an engine block 16 is illustrated and which supports an oil pan 17. A cylinder head assembly 18 is attached to block 16. A valve cover structure 20 which encloses an overhead camshaft (not visible) is attached to the cylinder head 18. The overhead cam shaft extends past the rightward end of valve cover 20 and supports a toothed sprocket 22 around which a drivebelt 24 extends. The drivebelt 24 also engages over a toothed sprocket 26 which is on the engine crankshaft (not visible). A toothed idler sprocket or gear 27 is also mounted on the engine block 16 for a conventional and known purpose which has no bearing on the subject invention. The crankshaft is connected at the leftward end of the engine to a torque tube or driveshaft 28 which is shown in FIG. 1. The driveshaft is connected to a test instrument or dynamometer 34. The purpose of the dynamometer 34 is to measure engine torque while simultaneously placing an imposed load on the engine 10 during the test.

In FIG. 1, the engine 10 also includes various functional components such as an intake manifold 30 which supports a carburetor 31 and an exhaust manifold 32 which is adapted to be connected to conduit means or tubing to carry away exhaust gases from the test engine.

As to mounting engine 10 to frame 12, the engine is connected at its leftward end to a support plate 36 which is in turn fastened to spaced mounting brackets 38 and 38' as shown in FIG. 1 and located on frame 12 in FIG. 2. The rightward end of engine 10 is supported by a horizontal bracket means 40 which connects to a vertical bracket means 42. The bracket components 40,42 are securely attached to one another by means of bracket 44 and associated fasteners. The vertical support member 42 is attached at its lower end to a bar 46 extending normal to the plane of the paper in FIG. 1. Bar 46 is in turn attached by appropriate fasteners to the test frame 12.

The frame 12 is best shown in FIGS. 2 and 3. Portions of frame 12 extend generally parallel to the engine crankshaft and specifically include U-shaped channel members 48 and 50 to one side of the engine and similar members 52 and 54 to the other side of the engine. The members 48 and 50 define an elongated channel or slot 56 therebetween. Likewise, the members 52 and 54 define an elongated channel or slot 58. Members 48, 50, 52 and 54 are attached at their respective ends to laterally extending members 60 and 62. Various weldments 64 provide an attaching function between various framing members. In addition, the frame 12 includes intermediate cross members 66 and 68 at either end of the test frame. They are attached by weldments to members 50 and 54. In addition, to the aforementioned members, a longitudinally extending member 70 is attached to one end portion of the frame adjacent to the laterally extending member 60. Similarly, another longitudinally extending member 72 is attached to the other end of the frame by weldments adjacent member 62.

Both members 70 and 72 are U-shaped in cross-section. The previously described frame members 48 through 68 were attached one to another by weldments in a single plane whereas members 70 and 72 are attached by weldments to the bottom of member 60,66 and 62,68 respectively. Members 70,72 are oriented to form open bottomed channel means with depending leg or side portions 70' and 70''. The purpose for providing an open bottomed channel at either end of the frame is clear by an examination of FIGS. 3 and 6. For initially guiding frame member 12 into approximate position with respect to ground support means, an elongated I-beam 74 is secured to the ground 14. The I-beam member 74 includes a wide base portion 76 as well as a narrower upper portion or web 78. The web 78 is slightly narrower than the width of the bottom opening channel formed by the members 70 and 72. Thus engagement between the web 78 and the channels 70,72 forces the engine frame 12 to be approximately positioned with respect to ground support means for the frame which will be described hereinafter. Also, an end wall 80 is attached by weldments to the channel member 70 so that one end of the I-beam 74 engages wall member 80 when the frame has longitudinally moved a desired distance toward dynamometer 34 as in FIG. 1. In FIG. 1 the engagement between the end of I-beam 74 and the wall 80 can be readily observed.

The engine test frame 12 is supported with respect to the ground 14 by a plurality of post-like supports one of which is numbered 82 as shown in FIG. 1. Post support 82 is imbedded in the ground structure 14 a sufficient distance to provide a very solid and secure anchor for frame 12. Similar posts are located at the remaining three corners of the rectangular frame 12. In FIG. 1, a second post 106 is visible.

Referring again to the first mentioned post support 82, FIG. 4 shows in greater detail the connection between post 82 and frame 12 or more specifically the end of laterally extending member 62. An elongated bolt type fastener 84 secures the frame member 62 to the post 82 and has a head portion 86 and an elongated shaft portion 88. A washer 90 is also shown which may be a locking type to prevent dis-engagement between the members 62 and 82. The post 82 includes a bore 92 extending axially therethrough. At the upper end portion of the post 82, a tapered surface 94 is formed by a conically shaped bore in the end of the post. The tapered surface 94 is engaged by a similarly configured surface 100 of a spacer member 96 which has a bore 98 therethrough for the passage of bolt shaft 88. The spacer 96 is attached by weldments 102 to the frame member 62. When the beam member 62 and spacer 96 are brought within a rough proximity to their desired location with respect to the dynamometers, the frame 12 with an engine thereon can be lowered so that the tapered surfaces of member 96 and post 82 engage. When the tapered surfaces engage, the frame and post are accurately positioned. Normally, two such alignment structures are sufficient to position the frame 12 with respect to the post supports. The two alignment structures such as shown in FIG. 4 may be located at the diagonally opposite positions shown in FIG. 2 and evidenced by the numerals 84 and 84' in the lower left and the upper right corners of frame 12.

As previously mentioned, alignment of the frame 12 with respect to the post supports is accomplished mostly by the structure as shown in FIG. 4. The remaining diametrically opposed corners of frame 12 do not require the alignment hardware as shown in FIG. 4 but instead use the simple elevational only adjusting structure as is illustrated in FIG. 5. Specifically, a post support 106 is used which is similar to the structure of post 82 but is without the tapered surface formed by the conical bore. Instead, the post structure 106 has a flat upper surface and has a central bore 108 therethrough for the passage of shaft or body 104 of a bolt fastener similar to fastener 84. The flat upper surface of the post 106 is engaged by a spacer member 110 which is attached by a weldment to the end of the frame member 60 (not shown in FIG. 5). Member 110 has a bore 112 for the passage of the body 104 of the fastener.

From the detailed discussion heretofore of the preferred embodiment it can be readily understood how the productivity of a given test instrument such as the dynamometer 34 can be greatly improved by the subject invention. Engines are readily and rapidly pre-mounted on a simple and inexpensive frame 12 at a location remote from the dynamometer. Test engines can be easily interchanged by simply undoing the fasteners 84. 84', and 104, 104' and then the frame 12 can be lifted from the post supports so that the engine and frame can be removed as a unit to a remote location while another engine and frame are installed.

Although the application so far has described in detail only one representative embodiment and the drawings have disclosed only the one embodiment, it should be apparent that the invention as defined by the following claims is entitled to cover equivalent structures.

What is claimed is as follows:

1. For test mounting an engine in accurate alignment and proximity to a dynamometer; an engine support means comprising; a frame including longitudinally extending members in substantial parallelism one with the other and generally aligned with the engine crankshaft; laterally extending end members directed substantially normal to the longitudinally extending members, all members being attached rigidly to one another in a single plane; engine bracket support means attaching to the longitudinal members and extending upward for attachment to the test engine; a plurality of ground post means to support the frame structure at least three points about its perimeter, the post supports extending into the ground sufficiently to provide a solid attachment of the frame to the ground; spacer means between the frame structure and the post supports constructed to provide a level surface of the frame; means between at least two of the spacer means and the respective post supports relating thereto being configured with matching surface configurations so that when the frame moves into approximate location with respect to the post support and is lowered thereto, the surfaces engage to align the frame structure with respect to the post supports so that an accurate positioning of the frame structure is formed with respect to the posts and an associated dynamometer; fastener means extending through the spacer means to rigidly secure the frame to the post structure.

2. For mounting a test engine in accurate alignment and proximity to a dynamometer, an engine support means comprising; an engine support frame including longitudinally extending members in substantial parallelism and generally in the direction of the engine crankshaft; the frame also including laterally extending end members fixed substantially normal to the longitudinally extending members and with all members attached rigidly one to another in a single plane; engine support bracket means attaching to either end of a test engine and extending downward for attachment to the longitudinally extending frame members; a plurality of post support means which engage the frame structure at points near its perimeter the post supports extending into the ground sufficiently to provide a solid attachment of the frame to the ground structure; spacer means between the frame structure and the post supports to provide an absolutely level surface of the frame for mounting the engine; alignment means including at least two of the spacer means and their respective post supports for positioning the engine accurately with respect to the dynamometer, the spacer and respective post members being configured with matching tapered configurations with a mate portion of one member engaging a conforming female portion of the other member when the frame is moved to approximate location with respect to the dynamometer and lowered onto the post, the tapered surfaces engaging to slightly move the frame structure with respect to the post supports so that an accurate and repeatable positioning of the frame structure is formed with respect to an associated dynamometer fastener means extending through the spacer means and into the post structure for rigidly attaching the frame to the post and to the ground structure.

3. For mounting a test engine in accurate alignment and proximity to a dynamometer, an engine support means comprising: an engine support frame including longitudinally extending members in substantial parallelism and generally in the direction of the engine crankshaft; the frame also including laterally extending end members fixed substantially normal to the longitudinally extending members and with all members attached rigidly one to another in a single plane; engine support means attaching to either end of a test engine and extending downward for attachment to the longitudinally extending frame members; a plurality of post support means which engage the frame structure at points near its perimeter, the post supports extending into the ground sufficiently to provide a solid attachment of the frame to the ground structure; spacer members between the frame structure and the post supports providing a level mount surface for the engine; alignment means including at least two of the spacer members and their respective post supports for finally positioning the engine with respect to the dynamometer; initial guidance means between the frame and the ground structure to pre-position the frame spacer members with respect to the post supports so that upon lowering of the frame the alignment means operatively engage, the guidance means including a member attached to the ground structure and a member depending from the frame, whereby interaction therebetween positions the frame both in a longitudinal direction and in a lateral direction.

4. The support means of claim 2 in which a pair of longitudinal members generally extend along either side of the test engine thereby defining elongated slot means therebetween for attaching the engine support bracket means to the frame, the elongated slot means accommodating attachment of the bracket means over a wide longitudinal range.

5. The support means of claim 2 in which spacer means and therefore related pole supports are located on both end portions of the laterally extending frame members thereby providing four spaced supports of the frame with respect to the ground structure.

6. The support means of claim 2 in which a spacer means has a conically shaped lower end portion and the upper end portion of a mated pole support is formed with an open tapped and conically configured hollow whereby the end portions tend to nest with each other and axially align the respective spacer and post as the frame is lowered onto the post structure.

7. The support means of claim 3 in which the initial guidance means includes an elongated I-beam secured to the ground structure which has a wide horizontal top portion, the I-beam being generally in parallelism with the desired axis of the frame when mounted with respect to the dynamometer, means at both ends of the frame with depending and spaced side walls and an open lower portion for receiving the wide horizontal portion of the I-beam as the frame is moved over and along the I-beam and toward the dynamometer.

8. The support means of claim 7 in which a laterally extending stop wall is attached across the depending side walls for engagement with the end of the I-beam and stopping further movement of the frame with respect to the dynamometer.

* * * * *